United States Patent
Sundaram et al.

(10) Patent No.: US 10,462,672 B1
(45) Date of Patent: Oct. 29, 2019

(54) SYSTEMS AND METHODS FOR MANAGING WIRELESS-NETWORK DEAUTHENTICATION ATTACKS

(71) Applicant: Symantec Corporation, Mountain View, CA (US)

(72) Inventors: Ramakrishnan Meenakshi Sundaram, Chennai (IN); Bruce McCorkendale, Manhattan Beach, CA (US); Justin Harmon, Knoxville, TN (US); Srini Chillappa, San Ramon, CA (US)

(73) Assignee: Symantec Corporation, Mountain View, CA (US)

( * ) Notice: Subject to any disclaimer, the term of this patent is extended or adjusted under 35 U.S.C. 154(b) by 176 days.

(21) Appl. No.: 15/282,742

(22) Filed: Sep. 30, 2016

(51) Int. Cl.
*H04L 29/06* (2006.01)
*H04W 12/12* (2009.01)

(52) U.S. Cl.
CPC ......... *H04W 12/12* (2013.01); *H04L 63/1466* (2013.01)

(58) Field of Classification Search
CPC .......................... H04W 12/12; H04L 63/1466
See application file for complete search history.

(56) References Cited

U.S. PATENT DOCUMENTS

| | | | | |
|---|---|---|---|---|
| 2009/0119776 | A1* | 5/2009 | Palnitkar | G06Q 20/10 726/25 |
| 2014/0259102 | A1* | 9/2014 | Gunasekara | H04W 12/06 726/2 |
| 2015/0103136 | A1* | 4/2015 | Anderson | H04L 12/18 348/14.09 |

(Continued)

OTHER PUBLICATIONS

Infrastructure Management Frame Protection (MFP) with WLC and LAP Configuration Example; https://web-beta.archive.org/web/20140217120358/http://www.cisco.com/c/en/us/support/docs/wireless-mobility/WLAN-security/82196-mfp.html; Cisco; Jan. 21, 2008.

(Continued)

*Primary Examiner* — Farid Homayounmehr
*Assistant Examiner* — Suman Debnath
(74) *Attorney, Agent, or Firm* — FisherBroyles, LLP (57) ABSTRACT

The disclosed computer-implemented method for managing wireless-network deauthentication attacks may include (1) detecting, at the wireless access point, a deauthentication signal, transmitted over a wireless network that is managed at least in part by the wireless access point, that prompts a target computing device to disconnect from the wireless network, (2) determining both that the deauthentication signal is directed to the target computing device and that the deauthentication signal was not initiated by the wireless access point, (3) determining, based at least in part on the determination that the deauthentication signal was not initiated by the wireless access point, that the deauthentication signal represents an illegitimate deauthentication signal, and (4) performing, in response to determining that the deauthentication signal represents an illegitimate deauthentication signal, a security action to mitigate effects of the illegitimate deauthentication signal on the target computing device. Various other methods, systems, and computer-readable media are also disclosed.

20 Claims, 7 Drawing Sheets

(56) References Cited

U.S. PATENT DOCUMENTS

2015/0334182 A1* 11/2015 Wu .................... H04L 67/1095
                                                         707/620

OTHER PUBLICATIONS

Deauthentication; https://www.aircrack-ng.org/doku.php?id=deauthentication, as accessed Aug. 16, 2016; Aircrack-ng; Page last modified Nov. 21, 2010; Oct. 11, 2006.

* cited by examiner

SYSTEMS AND METHODS FOR MANAGING WIRELESS-NETWORK DEAUTHENTICATION ATTACKS

BACKGROUND

Individuals and organizations frequently make use of wireless networks to provide quick and easy network accessibility to many different devices, such as personal computers, laptops, smart phones, etc. Individuals and organizations may use wireless network connections as part of day-to-day business, including the transfer of sensitive information. While such wireless connections are frequently secured through a variety of means, such as Wi-Fi Protected Access (WPA) or Wired Equivalent Privacy (WEP), attackers may nevertheless use certain methods to circumvent or subvert such security in order to gain access to sensitive information. Furthermore, certain entities (e.g., hotels that provide guest Wi-Fi) may seek to prevent users from using an endpoint device as a "hotspot" for other devices and accordingly use a variety of methods to force specific devices off the network.

One such method of subverting wireless connection security and/or forcing a device off of a wireless network includes transmitting a deauthentication signal to a target device, thus prompting the device to disconnect from the network. Attackers seeking to subvert an otherwise secure connection may then observe network communications between the targeted device and a wireless access point in an attempt to "sniff" or record information about reconnection attempts and use that information to subvert the connection. The instant disclosure, therefore, identifies and addresses a need for systems and methods for managing wireless-network deauthentication attacks.

SUMMARY

As will be described in greater detail below, the instant disclosure describes various systems and methods for managing wireless-network deauthentication attacks. In one example, a computer-implemented method for managing wireless-network deauthentication attacks may include (i) detecting, at the wireless access point, a deauthentication signal that prompts a target computing device to disconnect from the wireless network, (ii) determining both that the deauthentication signal is directed to the target computing device and that the deauthentication signal was not initiated by the wireless access point, (iii) determining, based at least in part on the determination that the deauthentication signal was not initiated by the wireless access point, that the deauthentication signal represents an illegitimate deauthentication signal, and (iv) performing, in response to determining that the deauthentication signal represents an illegitimate deauthentication signal, a security action to mitigate effects of the illegitimate deauthentication signal on the target computing device. In some embodiments, the wireless access point may include an endpoint computing device that serves as a wireless hotspot for other computing devices.

In some examples, the computer-implemented method may include using a device fingerprint to detect and pre-emptively block additional illegitimate deauthentication signals from the attacker computing device. For example, the computer-implemented method may include generating, based at least in part on information contained in the illegitimate deauthentication signal, a device fingerprint for an attacker computing device that transmitted the illegitimate deauthentication signal.

The computer-implemented method may additionally include providing the device fingerprint to a backend device fingerprinting system. Such a backend device fingerprinting system may maintain a database of device fingerprints for computing devices known to have transmitted illegitimate deauthentication signals. The backend device fingerprinting system may also provision information in the database to a group of client wireless access points. In one embodiment, the computer-implemented method may further include receiving, from the backend device fingerprinting system, a previously established device fingerprint that matches the device fingerprint for the attacker computing device and pre-emptively detecting and blocking, based on matching the previously established device fingerprint and the device fingerprint, illegitimate deauthentication signals from the attacker computing device.

Performing the security action may include a variety of tasks. For example, the computer-implemented method may include determining, by the wireless access point, a physical location of an attacking device that transmitted the illegitimate deauthentication signal. Additionally or alternatively, performing the security action may include throttling subsequent connection attempts by the target computing device. Furthermore, the computer-implemented method may further include causing the target device to ignore the illegitimate deauthentication signal and preventing the target device from disconnecting from the wireless network. Furthermore, in some examples, performing the security action may include notifying (i) an administrator of the wireless network, (ii) an administrator of the targeted computing device, (iii) an end user of the targeted computing device, and/or (iv) a software security system installed on the targeted computing device.

In one embodiment, a system for implementing the above-described method may include (i) a detection module, stored in memory, that detects, at the wireless access point, a deauthentication signal, transmitted over a wireless network that is managed at least in part by the wireless access point, that prompts a target computing device to disconnect from the wireless network, (ii) a determination module, stored in memory, that (a) determines both that the deauthentication signal is directed to the target computing device and that the deauthentication signal was not initiated by the wireless access point and (b) determines, based at least in part on the determination that the deauthentication signal was not initiated by the wireless access point, that the deauthentication signal represents an illegitimate deauthentication signal, (iii) a security module, stored in memory, that performs, in response to determining that the deauthentication signal represents an illegitimate deauthentication signal, a security action to mitigate effects of the illegitimate deauthentication signal on the target computing device, and (iv) at least one physical processor configured to execute the detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, at the wireless access point, a deauthentication signal, transmitted over a wireless network that is managed at least in part by the wireless access point, that prompts a target computing device to disconnect from the wireless network, (ii) determine both that the deauthentication signal is directed to the target computing device and that the deauthentication signal was not initiated by the wireless access point, (iii) determine, based at least in part on the determination that the deauthentication signal was not initiated by the wireless access point, that the deauthentication signal represents an illegitimate deauthentication signal, and (iv) perform, in response to determining that the deauthentication signal represents an illegitimate deauthentication signal, a security action to mitigate effects of the illegitimate deauthentication signal on the target computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing wireless-network deauthentication attacks. As will be explained in greater detail below, by identifying and analyzing deauthentication signals transmitted over a wireless network, the systems and methods described herein may empower security-enabled wireless access points to undertake a variety of actions to mitigate the effects of fraudulent deauthentication signals on computing devices connected to a wireless network.

Furthermore, the systems and methods described herein may enhance the functioning of wireless access points and/or personal computer network-security systems by allowing those systems to pre-emptively detect and block and/or ignore illegitimate deauthentication signals. Such pre-emptive protection may altogether prevent illegitimate deauthentication signals from disconnecting a targeted device and/or prevent an attacker from gaining information necessary to further subvert the wireless network. The disclosed systems and methods may further enhance the field of network security by crowd-sourcing data across many network devices to identify and secure systems against deauthentication attacks performed by specific devices.

Figure 1:
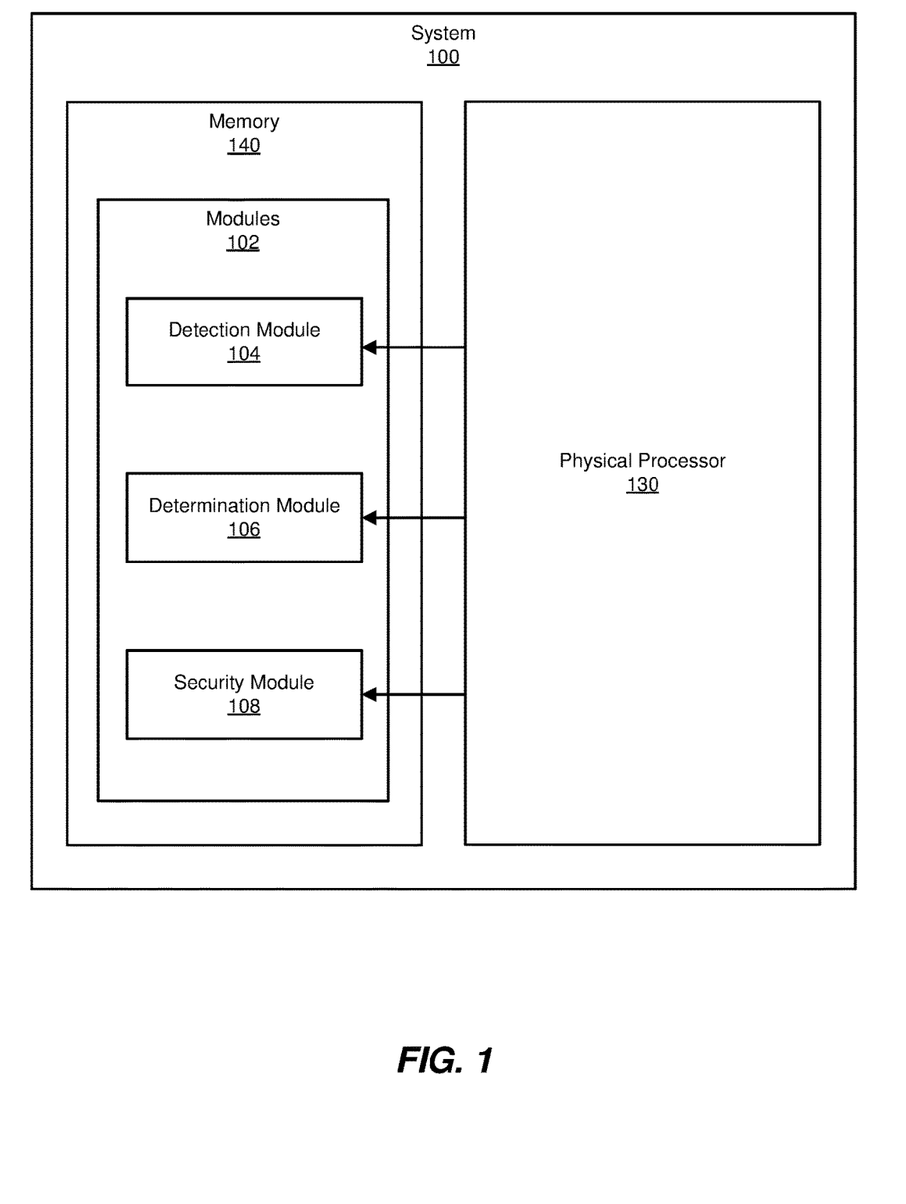
FIG. 1 is a block diagram of an example system for managing wireless-network deauthentication attacks.
Figure 2:
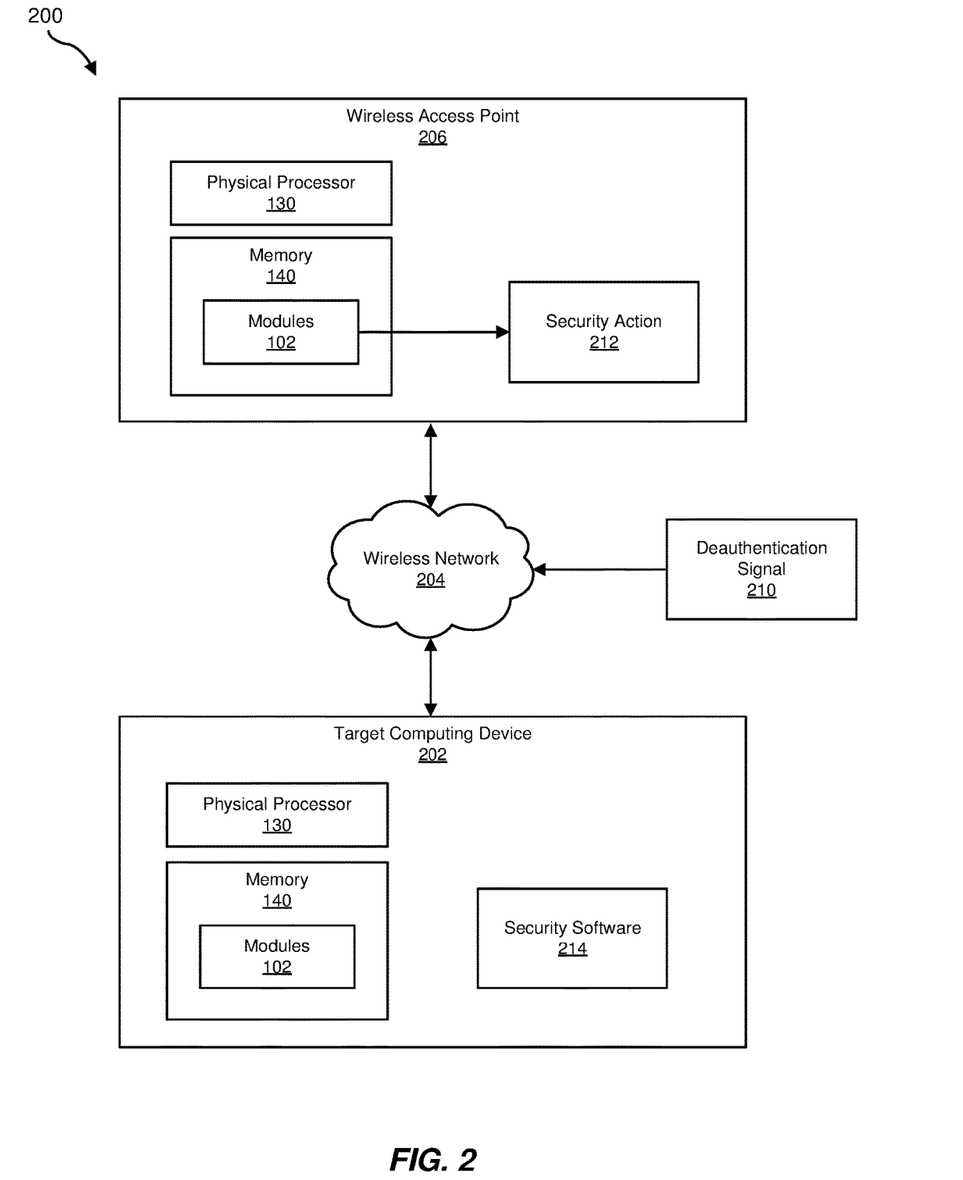
FIG. 2 is a block diagram of an additional example system for managing wireless-network deauthentication attacks.

The following will provide, with reference to FIGS. 1-2, detailed descriptions of example systems for managing wireless-network deauthentication attacks. Detailed descriptions of corresponding computer-implemented methods will also be provided in connection with FIG. 3. Detailed descriptions of an example deauthentication attack over a wireless network will be provided in connection with FIG. 4. Additionally, detailed descriptions of examples systems for managing deauthentication attacks through the use of a backend device-fingerprinting system will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for managing wireless-network deauthentication attacks. As illustrated in this figure, system 100 may include one or more modules 102 for performing one or more tasks. For example, and as will be explained in greater detail below, system 100 may include a detection module 104 that detects, at a wireless access point, a deauthentication signal, transmitted over a wireless network that is managed at least in part by the wireless access point. The deauthentication signal may prompt a target computing device to disconnect from the wireless network. System 100 may additionally include a determination module 106 that determines both that the deauthentication signal is directed to the target computing device and that the deauthentication signal was not initiated by the wireless access point. Determination module 106 may also determine that the deauthentication signal represents an illegitimate deauthentication signal based at least in part on the determination that the deauthentication signal was not initiated by the wireless access point. System 100 may further include a security module 108 that performs a security action to mitigate effects of the illegitimate deauthentication signal on the target computing device.

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., target computing device 202 and/or wireless access point 206). One or more of modules 102 in FIG. 1 may also represent all or portions of one or more special-purpose computers configured to perform one or more tasks.

As illustrated in FIG. 1, example system 100 may also include one or more memory devices, such as memory 140.

Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may additionally include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing wireless-network deauthentication attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a target computing device 202 in communication with a wireless access point 206 via a wireless network 204. In one example, all or a portion of the functionality of modules 102 may be performed by target computing device 202, wireless access point 206, and/or any other suitable computing system. As will be described in greater detail below, one or more of modules 102 from FIG. 1 may, when executed by at least one processor of target computing device 202 and/or wireless access point 206, enable target computing device 202 and/or wireless access point 206 to detect and/or mitigate deauthentication attacks. For example, and as will be described in greater detail below, detection module 104 may detect, at wireless access point 206, a deauthentication signal 210, transmitted over a wireless network 204 that is managed at least in part by wireless access point 206. Deauthentication signal 210 may prompt a target computing device 202 to disconnect from wireless network 204. Determination module 106 may determine both that deauthentication signal 210 is directed to target computing device 202 and that deauthentication signal 210 was not initiated by wireless access point 206. Determination module 106 may determine, based at least in part on the determination that deauthentication signal 210 was not initiated by wireless access point 206, that deauthentication signal 210 represents an illegitimate deauthentication signal. Security module 108 may perform, in response to determining that deauthentication signal 210 represents an illegitimate deauthentication signal, a security action 212 to mitigate effects of deauthentication signal 210 on target computing device 202.

Target computing device 202 generally represents any type or form of computing device that is capable of reading computer-executable instructions and connecting to a wireless network. In some examples, target computing device 202 may represent a personal computer or mobile device that connects to a wireless network. Specifically, target computing device 202 may be a user's personal laptop or mobile device. Additional examples of target computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Wireless access point 206 generally represents any type or form of computing device that is capable of managing wireless network traffic for one or more computing devices. Examples of wireless access point 206 include, without limitation, wireless modems, wireless routers, wireless repeaters, wireless network equipped computing devices acting as a wireless hotspot for other devices, and/or any other suitable hardware that is capable of moderating wireless network traffic. Wireless access point 206 may connect devices to another network, such as the Internet, through other networking equipment not described here. Although illustrated as a single entity in FIG. 2, wireless access point 206 may include and/or represent a plurality of servers that work and/or operate in conjunction with one another.

Wireless network 204 generally represents any medium or architecture capable of facilitating communication or data transfer over a wireless network. In one example, wireless network 204 may facilitate communication between target computing device 202 and wireless access point 206. Furthermore, wireless network 204 may be managed by one or more wireless access points, repeaters, and/or any other suitable networking hardware. Examples of wireless network 204 include, without limitation, an intranet, a Wireless Wide Area Network (WAN), a Wireless Local Area Network (LAN), a Wireless Personal Area Network (PAN), a Wireless Metropolitan Area Network (MAN), a cellular network (e.g., a Global System for Mobile Communications (GSM) network), portions of one or more of the same, variations or combinations of one or more of the same, and/or any other suitable method of wirelessly communicating electronic information.

Deauthentication signal 210 generally refers to a signal sent from one network-enabled device to another in order to inform a device that it has been disconnected from a network connection between those devices. Deauthentication signals, sometimes referred to as deauthentication frames, generally contain information describing a unique identifier (e.g., a Media Access Control, or MAC, address) of the computing device to be disconnected in addition to information describing the network that the computing device is to be disconnected from. In the examples provided herein, an attacker may generate a version deauthentication signal 210 that contains spoofed information and provide the fraudulent deauthentication signal to target computing device 202, wireless access point 206, or both. In other words, an attacker may pretend to be wireless computing device and/or a wireless access point in order to force a particular computing device off of a wireless network. Regardless of the mode of transmission of deauthentication signal 210, successful transmission and processing of deauthentication signal 210 may cause target computing device 202 to disconnect from wireless network 204 and/or cause wireless access point 206 to disconnect target computing device 202 from wireless network 204.

Security software 214 generally represents any software installed on a computing device that enables the computing device to monitor, configure, and manipulate network traffic to and/or from the computing device, thereby preserving the integrity of network connections made by the computing device. As will be described in greater detail below, security software 214 may enable target computing device 202 and/or wireless access point 206 to block and/or ignore certain communications transmitted over wireless network 204. Examples of security software 214 include, without limitation, network management software, firewalls, network monitors, combinations of one or more of the same, and/or any other suitable software that enables a computing device to ensure the integrity of network connections.

Figure 3:
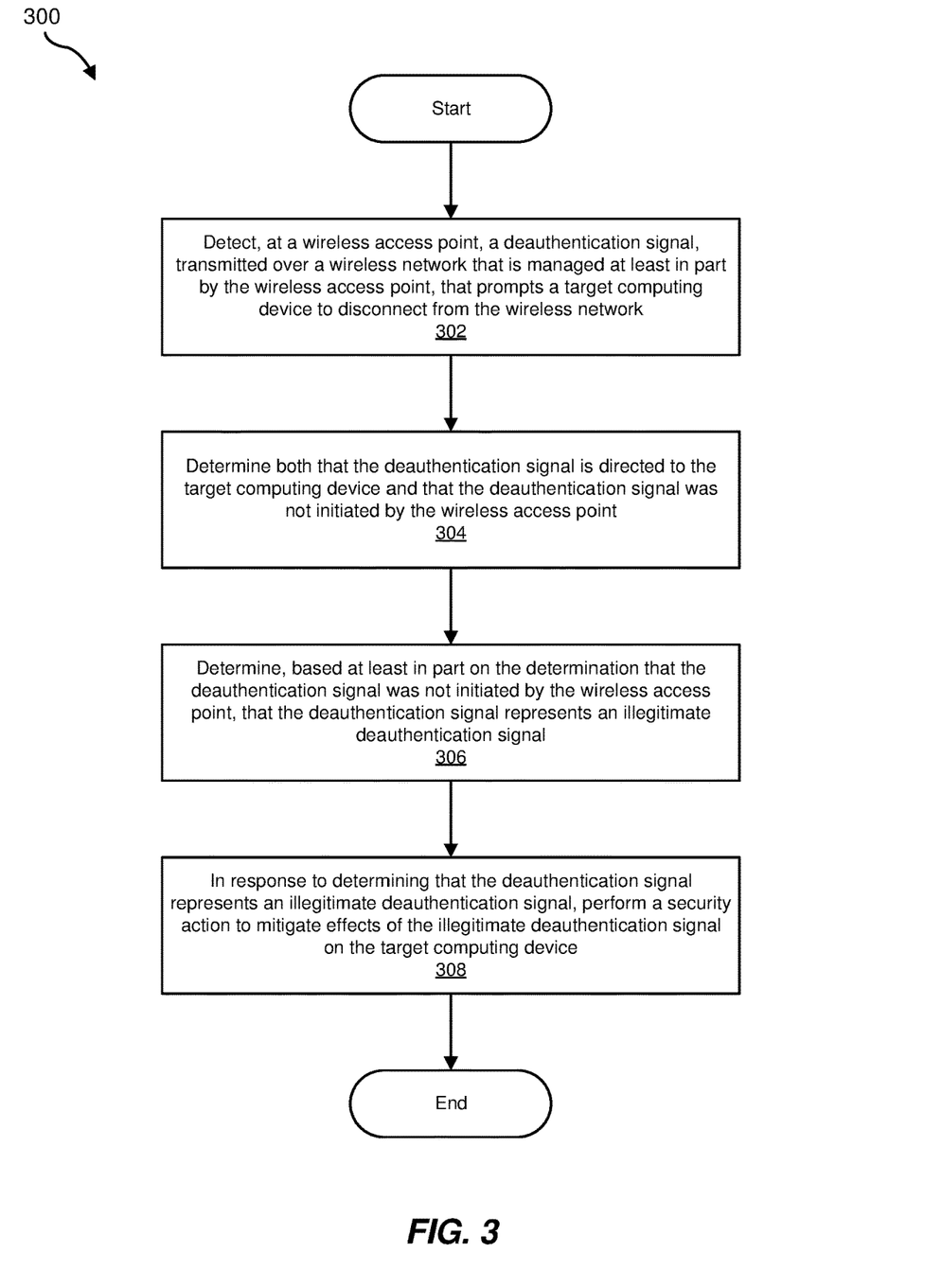
FIG. 3 is a flow diagram of an example method for managing wireless-network deauthentication attacks.

FIG. 3 is a flow diagram of an example computer-implemented method 300 for managing wireless-network deauthentication attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, at a wireless access point, a deauthentication signal that is transmitted over a wireless network that is managed at least in part by the wireless access point. The deauthentication signal may prompt a target computing device to disconnect from the wireless network. For example, detection module 104 may, as part of wireless access point 206 in FIG. 2, detect deauthentication signal 210 being transmitted over a wireless network 204 to prompt target computing device 202 to disconnect from wireless network 204.

Detection module 104 may detect deauthentication signal 210 in a variety of contexts. For example, detection module 104 may execute as part of wireless access point 206 and monitor network traffic handled by wireless access point 206. In such an example, detection module 104 may trigger analysis of deauthentication frames passed over wireless network 204. Similarly, detection module 104 may execute as part of multiple wireless access points, including wireless access point 206. These cooperating wireless access points may execute various tasks in concert to perform various security actions, as will be described in greater detail below.

In some embodiments, wireless access point 206 may include an endpoint computing device that serves as a wireless hotspot for other computing devices. In other words, the endpoint computing device may include software and/or hardware that allows it to act as a wireless router to connect other devices to a wireless network. In these examples, deauthentication signal 210 may be directed to devices connected to the device acting as a wireless hotspot, causing those devices to disconnect from the wireless hotspot and/or network. Alternatively, deauthentication signal 210 may be directed to the wireless hotspot device, causing the hotspot device to disconnect from one or more wireless networks.

Furthermore, detection module 104 may execute as part of target computing device 202. In these embodiments, detection module 104 may trigger analysis of deauthentication frames directed to target computing device 202.

At step 304 in FIG. 3, one or more of the systems described herein may determine both that the deauthentication signal is directed to the target computing device and that the deauthentication signal was not initiated by the wireless access point. For example, determination module 106 may, as part of wireless access point 206 in FIG. 2, determine both that deauthentication signal 210 is directed to target computing device 202 and that deauthentication signal 210 was not initiated by wireless access point 206.

Determination module 106 may examine information contained within deauthentication signal 210 in order to determine that deauthentication signal 210 is directed to target computing device 202. In general, a deauthentication signal or deauthentication frame may contain a unique identifier of the target computing device, such as a media access control (MAC) address of target computing device 202. Deauthentication signals may also contain information describing the device that allegedly transmitted the signal. For example, deauthentication signal 210 may contain information indicating that it was allegedly transmitted by wireless access point 206 and/or is to be transmitted over wireless network 204.

Determination module 106 may further determine that deauthentication signal 210 was not initiated by wireless access point 206. For example, determination module 106 may query other elements of wireless access point 206, such as network controllers or other hardware and/or software, to check if those elements triggered the transmission of deauthentication signal 210. Additionally or alternatively, determination module 106 may maintain a log of deauthentication signals transmitted by wireless access point 206 and/or other wireless access points that manage wireless network 204. If deauthentication signal 210 is not represented in this log, then determination module 106 may determine that deauthentication signal represents an illegitimate deauthentication signal. In some embodiments, wireless access point 206 may function as part of a larger network managed by multiple wireless access points. In such embodiments, determination module 106 may attempt to verify transmission of deauthentication signal 210 with those other wireless access points, as well.

At step 306, one or more of the systems described herein may determine, based at least in part on the determination that the deauthentication signal was not initiated by the wireless access point, that the deauthentication signal represents an illegitimate deauthentication signal. For example, determination module 106 may, as part of wireless access point 206 in FIG. 2, determine, based at least in part on the determination that deauthentication signal 210 was not initiated by wireless access point 206, that deauthentication signal 210 represents an illegitimate deauthentication signal.

As described in greater detail above in connection with step 304, determination module 106 may perform a variety of steps as part of determining the legitimacy of deauthentication signal 210. Should determination module 106 fail to obtain verification of the legitimacy of deauthentication signal 210, determination module 106 may determine that deauthentication signal 210 is a fraudulent or illegitimate deauthentication signal. Determination module 106 may then prompt other elements of modules 102 to undertake various security actions to mitigate the effects of deauthentication signal 210 on target computing device 202 and/or wireless network 204.

Figure 4:
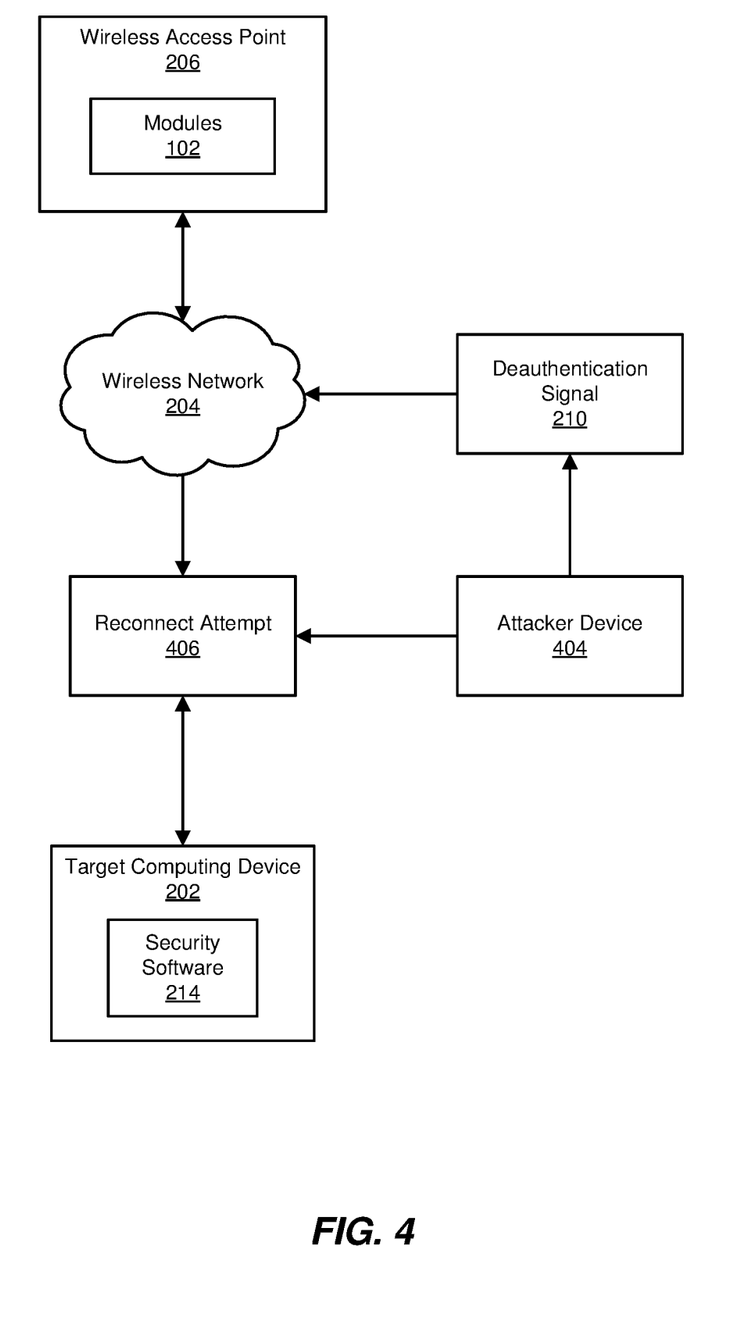
FIG. 4 is a block diagram of an example deauthentication attack over a wireless network.

The presence of an illegitimate deauthentication signal may be indicative of a deauthentication attack. In such an attack, an attacker forces a target computing device (e.g., target computing device 202 in FIG. 2) to disconnect from a wireless network, then observes reconnection attempts in order to facilitate further efforts to gain illegitimate access to information passed over the wireless network. An illustrated example of such an attack is provided in connection with FIG. 4. As shown in FIG. 4, an attacker device 404 may transmit deauthentication signal 210 over wireless network 204 in order to force target computing device 202 to disconnect from wireless network 204. Target computing device 202 may be configured to automatically connect to wireless network 204, and accordingly undertake a reconnect attempt 406. Attacker device 404 may be configured to examine wireless network 204 for reconnect attempt 406, and thereby acquire information necessary to perform further attacks on wireless network 204, such as password cracking or man-in-the-middle attacks. Since individuals and organizations may wish to secure their network connections against such attacks, one or more of modules 102 may undertake a variety of security actions to mitigate the effects of such deauthentication attacks.

Returning to FIG. 3 at step 308, one or more of the systems described herein may perform a security action to mitigate effects of the illegitimate deauthentication signal on the target computing device. For example, security module 108 may, as part of wireless access point 206 in FIG. 2, perform, in response to determining that deauthentication signal 210 represents an illegitimate deauthentication signal, a security action 212 to mitigate effects of deauthentication signal 210 on the target computing device 202.

Security module 108 perform a variety of tasks to mitigate the effects of deauthentication signal 210, even in situations where the systems and methods described herein are unable to prevent deauthentication signal 210 from causing target computing device 202 to disconnect from wireless network 204. In some embodiments, security module 108 may determine, by the wireless access point, a physical location of an attacking device that transmitted the illegitimate deauthentication signal. For example, some examples of wireless access point 206 may be equipped with directional antennas that can be used to determine the direction and approximate range of a particular computing device. These variants of wireless access point 206 may, in response to detecting an illegitimate deauthentication signal, determine and record distance and range information of the computing device that transmitted the illegitimate deauthentication signal. In examples where wireless access point 206 is aware of its own physical location (e.g., through a determined set of Global Positioning System [GPS] coordinates, or any other suitable geolocation method), wireless access point 206 may record and/or report a specific physical location for the computing device that transmitted the illegitimate deauthentication signal. Additionally or alternatively, security module 108 may coordinate functions across multiple cooperating wireless access points or other wireless-network equipped computing devices to triangulate the position of the attacker device, even if none of the cooperating devices are equipped with directional antennas. Security module 108 may then report the position of the attacking device to appropriate personnel, allowing them to address the attack directly, and/or record details about the attack in a security log. Security module 108 may additionally or alternatively generate a device fingerprint for the attacker device, as will be discussed in greater detail below.

Security module 108 may also cause target computing device 202 to take actions to protect itself. For example, security module 108 may, as part of security software 214 on target computing device 202, cause target computing device 202 to throttle subsequent connection attempts to wireless network 204. Additionally or alternatively, security module 108 may, as part of modules 102 on wireless access point 206, throttle responses to reconnect requests issued by target computing device 202. Reducing the frequency or number of connection attempts and/or responses may prevent an attacker from discovering information about the connection attempts, thereby preventing the attacker from subverting the connection. Furthermore, security module 108 may cause target computing device 202 to alert a user of target computing device 202 that the device was subject to a deauthentication attack. As a specific example, security module 108 may cause security software 214 to generate a popup notification and/or e-mail alert indicating that target computing device 202 was targeted by a deauthentication attack. Security module 108 may additionally or alternatively notify other relevant parties that a deauthentication attack may have taken place. For example, security module 108 may notify an administrator of the wireless network, an administrator of the targeted computing device, and/or a software security system installed on the targeted computing device.

In some examples, the systems described herein may cause the target device to ignore the illegitimate deauthentication signal and prevent the target device from disconnecting from the wireless network. As will be described in greater detail below, the systems and methods described herein may prevent wireless access point 206 and/or target computing device 202 from processing illegitimate deauthentication signals, thereby preventing the illegitimate deauthentication signal from disconnecting target computing device 202 from wireless network 204.

In certain embodiments, the systems and methods described herein may generate device fingerprints for devices suspected of transmitting illegitimate deauthentication signals. For example, one or more of modules 102 may generate, based at least in part on information contained in the illegitimate deauthentication signal, a device fingerprint for an attacker computing device that transmitted the illegitimate deauthentication signal. This device fingerprint may be generated based on a variety of factors, including but not limited to the device's Transmission Control Protocol/Internet Protocol (TCP/IP) settings, information about an operating system running on the device, wireless networking configurations, hardware clock skew, a unique identifier (e.g., MAC address) of the device, and/or any other suitable parameters. The systems and methods described herein may use this generated device fingerprint in a variety of ways. For example, security module 108 may maintain a database containing device fingerprints of devices known to transmit illegitimate deauthentication signals. Security module 108 may then cause wireless access point 206 and/or target computing device 202 to ignore deauthentication signals transmitted from devices with those device fingerprints.

Additionally or alternatively, security module 108 may provide the device fingerprint to a backend device fingerprinting system that maintains a database of device fingerprints for computing devices known to have transmitted illegitimate deauthentication signals. This backend system may receive device fingerprints from many wireless access points and/or computing devices, and provision information contained within the database to these client devices. The backend system may thereby enable security modules executing on the client devices to pre-emptively detect, block, and/or ignore illegitimate deauthentication signals, even if the client device has not previously experienced a deauthentication attack originating from a particular attacker device. In other words, one or more of modules 102 may receive, from the backend device fingerprinting system, a previously established device fingerprint that matches the device fingerprint for the attacker computing device. Security module 108 may use this information to pre-emptively detect and block illegitimate deauthentication signals from the attacker computing device based on the device fingerprint received from the backend system.

Figure 5:
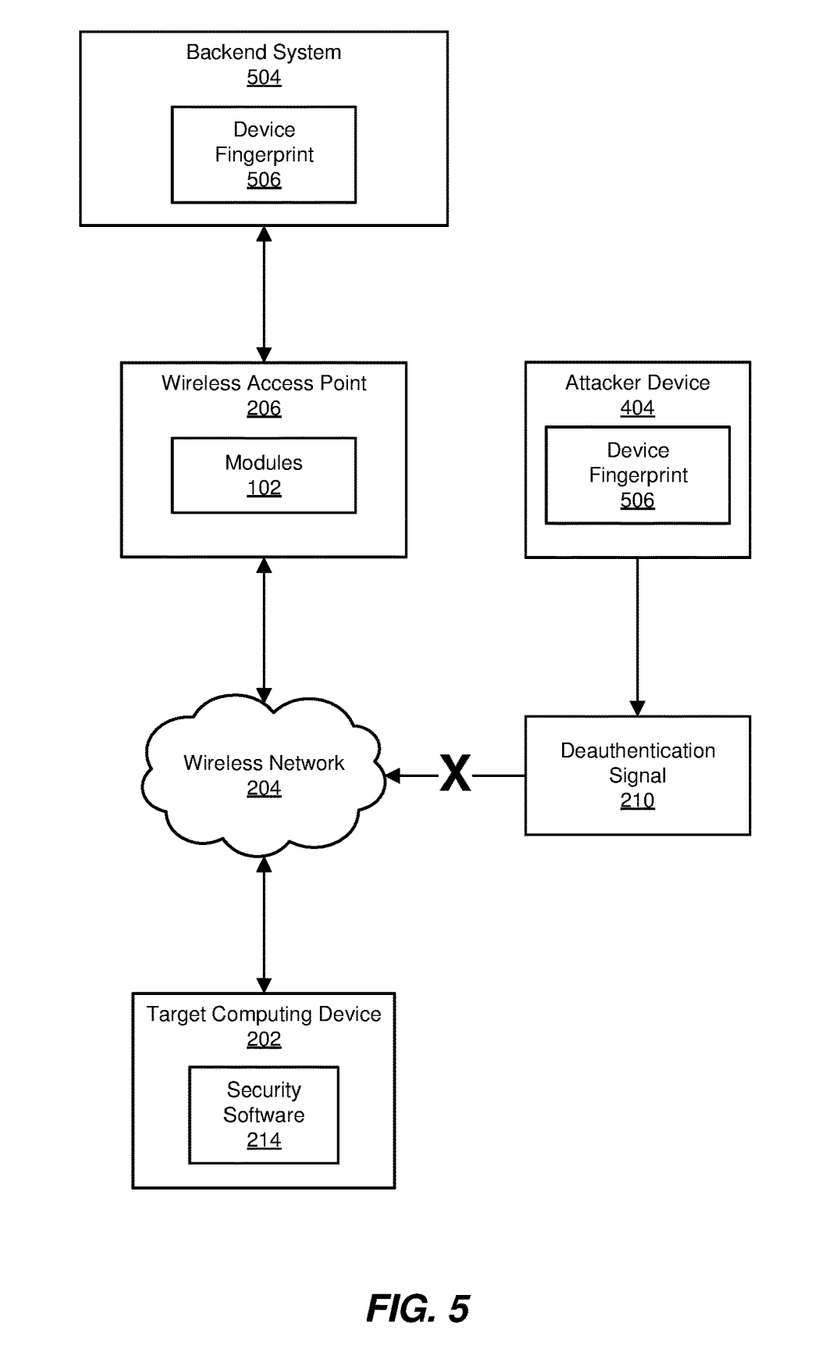
FIG. 5 is a block diagram of an example system for managing wireless-network deauthentication attacks using a backend device fingerprinting system.

An illustrated example of the above-described scenario is provided in connection with FIG. 5. As shown in FIG. 5, wireless access point 206 may communicate with a backend system 504 over a network, e.g., the Internet. Backend system 504 may operate as part of a security enterprise that provides security services to clients. Additionally or alternatively, backend system 504 may be part of a private database server that is managed by an organization for the purposes of securing that organization's networks against deauthentication attacks.

Backend system 504 may provide a device fingerprint 506 to wireless access point 206. Backend system 504 may have received device fingerprint 506 from another wireless access point (not illustrated) that experienced a deauthentication attack originating from attacker device 404, generated a device fingerprint for the attacking device, and provided device fingerprint 506 to backend system 504. Backend system 504 may subsequently provide device fingerprint 506 to wireless access point 206. One or more of modules 102 may then determine that deauthentication signal 210 was transmitted by an attacker device (e.g., attacker device 404) with a device fingerprint that matches device fingerprint 506. Security module 108 may then block deauthentication signal 210 from affecting target computing device 202.

Backend system 504 may provide device fingerprint 506 to wireless access point 206 in a variety of contexts. For example, backend system 504 may store device fingerprints in association with a physical location of where the device fingerprint was observed, and provide wireless access points with device fingerprints that are likely to be found in their general area. Additionally or alternatively, backend system 504 may provide wireless access point 206 with a list of device fingerprints containing device fingerprints of devices that have repeatedly and/or frequently issued illegitimate deauthentication signals.

As described above in connection with method 300 in FIG. 3, the systems and methods described herein may track deauthentication signals that are passed over a wireless network. By querying wireless access points and/or other devices that manage the wireless network, the disclosed systems and methods may enable wireless access points, routers, etc. to detect and address fraudulent deauthentication signals, such as by alerting users and/or throttling future connection attempts by the affected computing devices.

Furthermore, the devices that manage the wireless network may connect to a backend system as part of a crowd-sourced effort to pre-emptively address potential security threats. As described above, various components of a wireless network may provide information describing attacker devices and in turn receive information about other attacker devices gathered by other devices participating in the security network. The systems and methods described herein may thereby enable security systems to pre-emptively detect and block illegitimate deauthentication signals, thus preventing those fraudulent signals from affecting the targeted computing devices.

Figure 6:
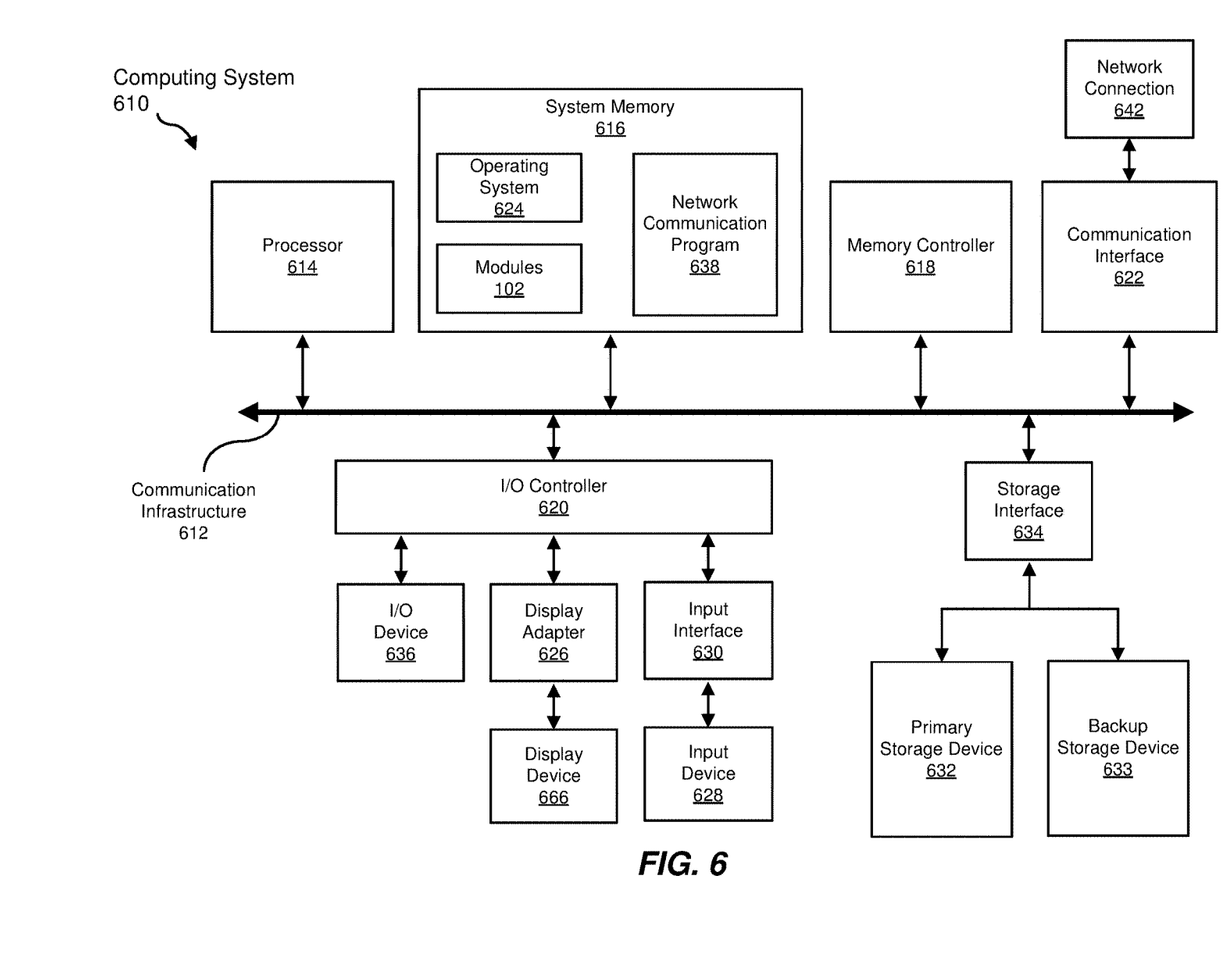
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 666 coupled to I/O controller 620 via a display adapter 626. Display device 666 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 666.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
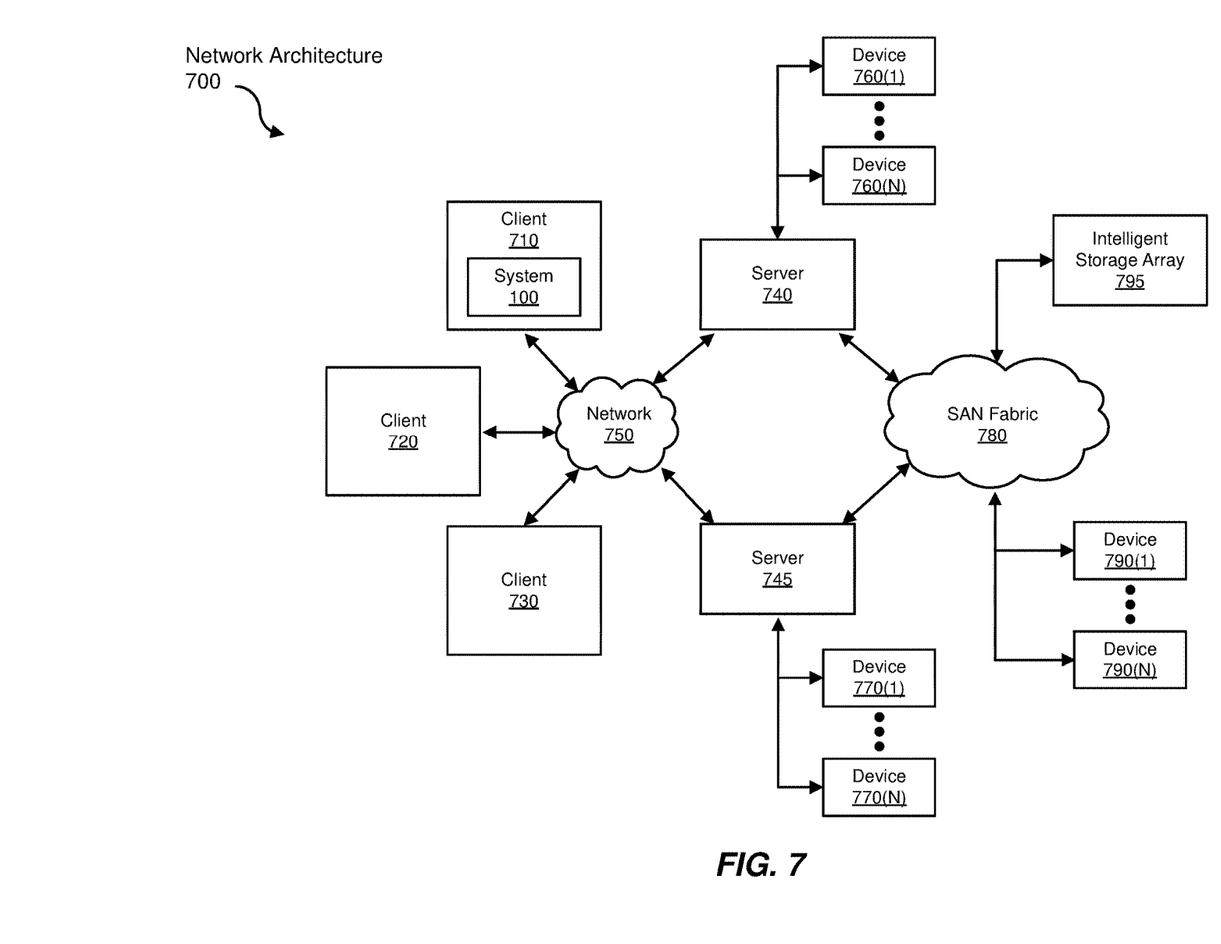
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for managing wireless-network deauthentication attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules described herein may receive a wireless network signal to be transformed, determine that the wireless network signal represents an illegitimate deauthentication signal, transform the illegitimate deauthentication signal into a device fingerprint that represents the attacking device that transmitted the illegitimate deauthentication signal, store a result of the transformation in a database, provide a result of the transformation to other instances of the modules described herein, use a result of the transformation to intercept future deauthentication signals transmitted by the attacking device, and/or perform a security action based on a result of detecting the illegitimate deauthentication signal. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing wireless-network deauthentication attacks, at least a portion of the method being performed by a wireless access point comprising at least one processor, the method comprising:
    detecting, at the wireless access point, a deauthentication signal, transmitted over a wireless network that is managed at least in part by the wireless access point, that prompts a target computing device to disconnect from a network connection between the target computing device and the wireless access point;
    determining, based at least in part on querying a log of deauthentication signals initiated by the wireless access point, both that the deauthentication signal is directed to the target computing device and that the deauthentication signal was not initiated by the wireless access point;
    determining, based at least in part on the determination that the deauthentication signal was not initiated by the wireless access point, that the deauthentication signal represents an illegitimate deauthentication signal; and
    performing, in response to determining that the deauthentication signal represents an illegitimate deauthentication signal, a security action to mitigate effects of the illegitimate deauthentication signal on the target computing device.

2. The method of claim 1, further comprising generating, based at least in part on information contained in the illegitimate deauthentication signal, a device fingerprint for an attacker computing device that transmitted the illegitimate deauthentication signal.

3. The method of claim 2, further comprising using the device fingerprint to detect and pre-emptively block additional illegitimate deauthentication signals from the attacker computing device.

4. The method of claim 2, further comprising providing the device fingerprint to a backend device fingerprinting system that:
    maintains a database of device fingerprints for computing devices known to have transmitted illegitimate deauthentication signals; and
    provisions information in the database to a plurality of client wireless access points.

5. The method of claim 4, further comprising:
    receiving, from the backend device fingerprinting system, a previously established device fingerprint that matches the device fingerprint for the attacker computing device; and
    pre-emptively detecting and blocking, based on matching the previously established device fingerprint and the device fingerprint, illegitimate deauthentication signals from the attacker computing device.

6. The method of claim 1, further comprising determining, by the wireless access point, a physical location of an attacking device that transmitted the illegitimate deauthentication signal.

7. The method of claim 1, wherein performing the security action comprises throttling subsequent connection attempts by the target computing device.

8. The method of claim 1, further comprising causing the target device to ignore the illegitimate deauthentication signal and preventing the target device from disconnecting from the wireless network.

9. The method of claim 1, wherein the wireless access point comprises an endpoint computing device that serves as a wireless hotspot for other computing devices.

10. The method of claim 1, wherein performing the security action comprises notifying at least one of:
    an administrator of the wireless network;
    an administrator of the targeted computing device;
    an end user of the targeted computing device; and
    a software security system installed on the targeted computing device.

11. A system for managing wireless-network deauthentication attacks, the system comprising:
    at least one physical processor; and
    a memory, the memory having stored thereon instructions that, when executed by the at least one physical processor of the system, cause the system to:
        detect, at a wireless access point, a deauthentication signal, transmitted over a wireless network that is managed at least in part by the wireless access point, that prompts a target computing device to disconnect from a network connection between the target computing device and the wireless access point;
        determine, based at least in part on querying a log of deauthentication signals initiated by the wireless access point, both that the deauthentication signal is directed to the target computing device and that the deauthentication signal was not initiated by the wireless access point;
        determine, based at least in part on the determination that the deauthentication signal was not initiated by the wireless access point, that the deauthentication signal represents an illegitimate deauthentication signal; and
        perform, in response to determining that the deauthentication signal represents an illegitimate deauthentication signal, a security action to mitigate effects of the illegitimate deauthentication signal on the target computing device.

12. The system of claim 11, wherein the memory stores further instructions that, when executed by the physical processor, cause the physical processor to generate, based at least in part on information contained in the illegitimate deauthentication signal, a device fingerprint for an attacker computing device that transmitted the illegitimate deauthentication signal.

13. The system of claim 12, wherein the performing the security action comprises using the device fingerprint to detect and pre-emptively block additional illegitimate deauthentication signals from the attacker computing device.

14. The system of claim 12, wherein the memory stores further instructions that, when executed by the physical processor, cause the physical processor to:
provide the device fingerprint to a backend device fingerprinting system;
maintain a database of device fingerprints for computing devices known to have transmitted illegitimate deauthentication signals; and
provision information in the database to a plurality of client wireless access points.

15. The system of claim 14, wherein the memory stores further instructions that, when executed by the physical processor, cause the physical processor to:
receive, from the backend device fingerprinting system, a previously established device fingerprint that matches the device fingerprint for the attacker computing device; and
pre-emptively detect and block, based on matching the previously established device fingerprint and the device fingerprint, illegitimate deauthentication signals from the attacker computing device.

16. The system of claim 11, performing the security action comprises determining, by the wireless access point, a physical location of an attacking device that transmitted the illegitimate deauthentication signal.

17. The system of claim 11, performing the security action comprises throttling subsequent connection attempts by the target computing device.

18. The system of claim 11, wherein the memory stores further instructions that, when executed by the physical processor, cause the physical processor to cause the target device to ignore the illegitimate deauthentication signal and prevent the target device from disconnecting from the wireless network.

19. The system of claim 11, wherein the wireless access point comprises an endpoint computing device that serves as a wireless hotspot for other computing devices.

20. A non-transitory computer-readable medium comprising one or more computer-readable instructions that, when executed by at least one processor of a computing device, cause the computing device to:
detect, at a wireless access point, a deauthentication signal, transmitted over a wireless network that is managed at least in part by the wireless access point, that prompts a target computing device to disconnect from a network connection between the target computing device the wireless access point;
determine, based at least in part on querying a log of deauthentication signals initiated by the wireless access point, both that the deauthentication signal is directed to the target computing device and that the deauthentication signal was not initiated by the wireless access point;
determine, based at least in part on the determination that the deauthentication signal was not initiated by the wireless access point, that the deauthentication signal represents an illegitimate deauthentication signal; and
perform, in response to determining that the deauthentication signal represents an illegitimate deauthentication signal, a security action to mitigate effects of the illegitimate deauthentication signal on the target computing device.

* * * * *